(12) United States Patent
Ryu et al.

(10) Patent No.: US 10,026,944 B2
(45) Date of Patent: Jul. 17, 2018

(54) ELECTRODE ASSEMBLY HAVING TAB-LEAD JOINT PORTION OF MINIMIZED RESISTANCE DIFFERENCE BETWEEN ELECTRODES AND ELECTROCHEMICAL CELL CONTAINING THE SAME

(71) Applicant: LG Chem, Ltd., Seoul (KR)

(72) Inventors: Ji Heon Ryu, Seoul (KR); Jeong Hee Choi, Busan (KR); Kwangho Yoo, Daejeon (KR); Youngjoon Shin, Daejeon (KR)

(73) Assignee: LG Chem, Ltd. (KR)

( * ) Notice: Subject to any disclaimer, the term of this patent is extended or adjusted under 35 U.S.C. 154(b) by 202 days.

(21) Appl. No.: 14/844,444

(22) Filed: Sep. 3, 2015

(65) Prior Publication Data

US 2015/0380717 A1    Dec. 31, 2015

Related U.S. Application Data

(63) Continuation of application No. 12/797,185, filed on Jun. 9, 2010, now Pat. No. 9,246,154, which is a
(Continued)

(30) Foreign Application Priority Data

Jul. 24, 2006    (KR) .................. 10-2006-0068825

(51) Int. Cl.
*H01M 2/22*    (2006.01)
*H01M 2/26*    (2006.01)
(Continued)

(52) U.S. Cl.
CPC .............. *H01M 2/26* (2013.01); *H01G 11/06* (2013.01); *H01G 11/26* (2013.01); *H01M 2/266* (2013.01);
(Continued)

(58) Field of Classification Search
CPC .... H01M 2/26; H01M 2/266; H01M 2220/30; H01M 10/04; H01G 11/06; H01G 11/26; Y02E 60/122
See application file for complete search history.

(56) References Cited

U.S. PATENT DOCUMENTS

| | | |
|---|---|---|
| 6,423,442 B1 | 7/2002 | Hallifax et al. |
| 6,849,358 B2 | 2/2005 | O'Connell |

(Continued)

FOREIGN PATENT DOCUMENTS

| | | |
|---|---|---|
| JP | 2002-252036 A | 9/2002 |
| JP | 2002305029 A | 10/2002 |

(Continued)

OTHER PUBLICATIONS

International Search Report from PCT/KR2007/003530, dated Oct. 17, 2007.

*Primary Examiner* — Cynthia K Walls
(74) *Attorney, Agent, or Firm* — Lerner, David, Littenberg, Krumholz & Mentlik, LLP

(57) ABSTRACT

Disclosed herein is a stacking or stacking/folding type electrode assembly of a cathode/separator/anode structure, wherein the electrode assembly is constructed in a structure in which tabs (electrode tabs), having no active material applied thereto, protrude from electrode plates constituting the electrode assembly, the electrode tabs are electrically connected to an electrode lead, and the pluralities of electrode tabs are joined to the top and the bottom of the electrode lead at an electrode lead-electrode tabs joint portion such that the resistance difference between electrodes at the electrode lead-electrode tabs joint portion is minimized. Also disclosed is an electrochemical cell including the electrode assembly.

9 Claims, 2 Drawing Sheets

Related U.S. Application Data continuation of application No. 12/309,549, filed as application No. PCT/KR2007/003530 on Jul. 21, 2007.

(51) Int. Cl.
  *H01G 11/06* (2013.01)
  *H01G 11/26* (2013.01)
  *H01M 10/04* (2006.01)

(52) U.S. Cl.
  CPC ........ *H01M 10/04* (2013.01); *H01M 2220/30* (2013.01); *Y02E 60/122* (2013.01)

(56) References Cited

U.S. PATENT DOCUMENTS

| | | |
|---|---|---|
| 2002/0164531 A1 | 11/2002 | Sekino et al. |
| 2005/0064278 A1 | 3/2005 | Fetcenko et al. |
| 2005/0100784 A1 | 5/2005 | Yageta et al. |
| 2005/0132562 A1 | 6/2005 | Saito et al. |
| 2007/0117020 A1 | 5/2007 | Baker et al. |
| 2009/0317717 A1 | 12/2009 | Ryu et al. |

FOREIGN PATENT DOCUMENTS

| | | |
|---|---|---|
| JP | 2003-123743 A | 4/2003 |
| JP | 2003-123746 A | 4/2003 |
| JP | 2003-157844 A | 5/2003 |
| JP | 2003257409 A | 9/2003 |
| JP | 2005142028 A | 6/2005 |
| JP | 2006324093 A | 11/2006 |
| JP | 2006351373 A | 12/2006 |
| JP | 2007335150 A | 12/2007 |
| JP | 2008027894 A | 2/2008 |
| KR | 2003-0095519 A | 12/2003 |

ELECTRODE ASSEMBLY HAVING TAB-LEAD JOINT PORTION OF MINIMIZED RESISTANCE DIFFERENCE BETWEEN ELECTRODES AND ELECTROCHEMICAL CELL CONTAINING THE SAME

CROSS REFERENCE TO RELATED APPLICATIONS

This application is a continuation of U.S. application Ser. No. 12/797,185, filed Jun. 9, 2010, which is a continuation of U.S. application Ser. No. 12/309,549, filed Jun. 24, 2009, now abandoned, which is a national phase entry under 35 U.S.C. § 371 of International Application No. PCT/KR2007/003530, filed Jul. 21, 2007, published in English, which claims the benefit of Korean Patent Application No. KR10-2006-0068825, filed Jul. 24, 2006, the disclosures of which applications are incorporated herein by reference.

FIELD OF THE INVENTION

The present invention relates to an electrode assembly having a tab ad joint portion of minimized resistance difference between electrodes, and, more particularly, to a stacking or stacking/folding type electrode assembly of a cathode/separator/anode structure, wherein the electrode assembly is constructed in a structure in which tabs (electrode tabs), having no active material applied thereto, protrude from electrode plates constituting the electrode assembly, the electrode tabs are electrically connected to an electrode lead, and the pluralities of electrode tabs are joined to the top and the bottom of the electrode lead at an electrode lead-electrode tabs joint portion such that the resistance difference between electrodes at the electrode lead-electrode tabs joint portion is minimized.

BACKGROUND OF THE INVENTION

As mobile devices have been increasingly developed, and the demand for such mobile devices has increased, the demand for batteries has also sharply increased as an energy source for the mobile devices. Also, much research on batteries satisfying various needs has been carried out.

In terms of the shone of batteries, the demand for prismatic secondary batteries or pouch-shaped secondary batteries, which are thin enough to be applied to products, such as mobile phones, is very high. In terms of the material for batteries, on the other hand, the demand for lithium secondary batteries, such as lithium ion batteries and lithium ion polymer batteries, having high energy density, high discharge voltage, and high output stability, is very high.

Furthermore, secondary batteries may be classified based on the construction of an electrode assembly having a cathode/separator/anode structure. For example, the electrode assembly may be constructed in a jelly-roll (winding) type structure in which long-sheet type cathodes and long-sheet type anodes are wound while separators are disposed respectively between the cathodes and the anodes, a stacking type structure in which pluralities of cathodes and anodes having a predetermined size are successively stacked while separators are disposed respectively between the cathodes and the anodes, or a stacking/folding type structure in which pluralities of cathodes and anodes having a predetermined size are successively stacked while separators are disposed respectively between the cathodes and the anodes to constitute a bi-cell or a full-cell, and then the bi-cell or the full-cell is wound.

FIG. 1 is a side view typically illustrating the general structure of a conventional representative stacking type electrode assembly.

Referring to FIG. 1, the stacking type electrode assembly 10 is constructed in a structure in which cathodes 20, each of which has a cathode active material 22 applied to the opposite major surfaces of a cathode current collector 21, and anodes 30, each of which has an anode active material 32 applied to the opposite major surfaces of an anode current collector 31, are sequentially stacked while separators 70 are disposed respectively between the cathodes 20 and the anodes 30.

From one-side ends of the cathode current collectors 21 and the anode current collectors 31 protrude pluralities of cathode tabs 41 and anode tabs 51, to which an active material is not applied, such that the cathode tabs 41 and the anode tabs 51 are electrically connected to a cathode lead 60 and an anode lead (not shown) constituting electrode terminals of a battery. The cathode tabs 41 and the anode tabs 51 are joined in a concentrated state, and are then connected to the cathode lead and the anode lead, respectively. This structure is more clearly illustrated in FIGS. 2 and 3, which are partially enlarged views typically illustrating the joint portion between the cathode tabs and the cathode lead. FIGS. 2 and 3 illustrate only the joint portion between the cathode tabs and the cathode lead for convenience of description, although this structure is also applied to the joint portion between the anode tabs and the anode lead.

Referring to these drawings, the cathode tabs 40 are brought into tight contact with each other in the direction indicated by an arrow, and are connected to the cathode lead 60. The cathode lead 60 is normally joined to the cathode tabs by welding. The cathode lead 60 may be joined to the cathode tabs while the cathode lead 60 is located at the top of the uppermost cathode tab 41, as shown in FIG. 2. Alternatively, the cathode lead 60 may be joined to the cathode tabs while the cathode lead 60 is located at the bottom of the lowermost cathode tab 42, as shown in FIG. 3.

Due to this joint structure, however, the resistance difference between the electrodes with respect to each electrode lead may occur in the electrode assembly. Specifically, the electrode resistance of the electrode tab at the shortest distance from the electrode lead is different from that of the electrode tab at the longest distance from the electrode lead. In a middle- or large-sized battery pack including the electrode assembly with the above-stated construction, large-capacity electricity is charged and discharged. Consequently, the electrodes may be nonuniformly operated or deteriorated, due to the resistance difference between the electrodes, which may reduce the life span of the battery.

Also, when the electrode tabs are joined to the electrode lead in the above-described structure, a welding process for the joining the electrode tabs and the electrode lead is performed only in one direction, with the result that the joint force between the electrode tabs and the electrode lead may be lowered.

Consequently, there is a high necessity for an electrode assembly having an improved structure in which the joint force between the electrode tabs and the electrode lead is increased while the resistance difference between the electrodes is minimized.

SUMMARY OF THE INVENTION

Therefore, the present invention has been made to solve the above problems, and other technical problems that have yet to be resolved.

Specifically, it is an object of the present invention to provide an electrode assembly having a structure in which the resistance difference between electrodes is minimized.

It is another object of the present invention to provide an electrode assembly having a structure in which the joint force between electrode tabs and each electrode lead is increased, whereby high reliability is secured.

It is a further object of the present invention to provide an electrochemical cell including the electrode assembly.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

In accordance with one aspect of the present invention, the above and other objects can be accomplished by the provision of a stacking or stacking/folding type electrode assembly of a cathode/separator/anode structure, wherein the electrode assembly is constructed in a structure in which tabs (electrode tabs), having no active material applied thereto, protrude from electrode plates constituting the electrode assembly, the electrode tabs are electrically connected to an electrode lead, and pluralities of electrode tabs are joined to the top and the bottom of the electrode lead at an electrode lead-electrode tabs joint portion such that the resistance difference between electrodes at the electrode lead-electrode tabs joint portion is minimized.

In a preferred embodiment, the number of the electrode tabs joined to the top of the electrode lead is approximately equal to that of the electrode tabs joined to the bottom of the electrode lead such that the electrode tabs are joined to the electrode lead approximately in a symmetrical fashion. Specifically, when a total of A electrode tabs are joined to the top of the electrode lead, the same number of electrode tabs, i.e., a total of A electrode tabs, or the similar number of electrode tabs, i.e., a total of A' electrode tabs, may be joined to the bottom of the electrode lead.

This structure will be described in more detail with reference to FIG. 4.

Figure 4:
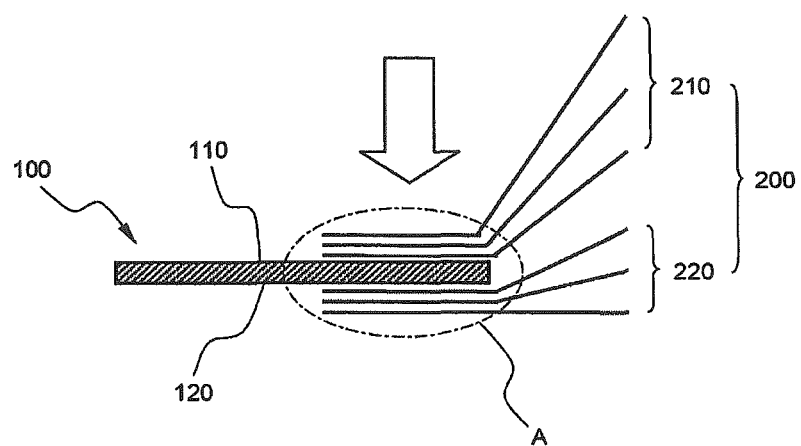
FIG. 4 is a partially enlarged view illustrating the connection between cathode tabs, joined to each other in a concentrated state, and a cathode lead of an electrode assembly according to a preferred embodiment of the present invention.

Referring to FIG. 4, electrode tabs 200 are joined to the electrode lead 100 while three electrode tabs 210 are located at the top 110 of the electrode lead 100, and three electrode tabs 220 are located at the bottom 120 of the electrode lead 100. Consequently, the electrode tabs 200 are disposed at the electrode lead 100, at a joint region A, in a symmetrical structure in which the electrode tabs 200 are disposed symmetrically at the top 110 and the bottom 120 of the electrode lead 100.

The electrode tabs 200 are brought into tight contact with each other in the direction indicated by an arrow, while the electrode lead 100 is disposed between the electrode tabs 200, and then the electrode lead 100 is joined to the electrode tabs 200 by welding. According to circumstances, the electrode lead 100 may be inserted between the electrode tabs 200, while the electrode tabs are in tight contact with each other, and then the electrode lead 100 may be joined to the electrode tabs 200 by welding.

According to the present invention, the electrode lead is not particularly restricted so long as the electrode lead is made of a material that can be electrically connected to the electrode tabs. Preferably, the electrode lead is made of a metal plate.

The metal plate may be selected from a group consisting of an aluminum plate, a copper plate, a nickel plate, a copper plate coated with nickel, and a SUS plate.

Also, the electrode lead is not particularly restricted so long as the electrode lead is constructed in a structure in which the electrode lead is easily connected to the electrode tabs. For example, the electrode lead may be formed in the shape of a straight line in vertical section. The electrode lead may be connected to the electrode tabs in various manners. Preferably, the electrode lead is more stably connected to the electrode tabs by welding. The welding may include ultrasonic welding, laser welding, and resistance welding.

In accordance with another aspect of the present invention, there is provided an electrochemical cell including the electrode assembly with the above-stated construction.

The electrochemical cell is one that provides electricity through an electrochemical reaction. For example, the electrochemical cell may be an electrochemical secondary battery or an electrochemical capacitor. Especially, the electrochemical cell is preferably applied to a lithium secondary battery.

The secondary battery includes an electrode assembly that can be charged and discharged. Preferably, the secondary battery is constructed in a structure in which an electrode assembly is mounted in a battery case made of a laminate sheet including a metal layer and a resin layer in a sealed state. The secondary battery with the above-described structure may be referred to as a pouch-shaped secondary battery.

Also, the secondary battery is preferably used as a unit cell for high-output, large-capacity battery packs.

Hereinafter, examples of the present invention will be described in more detail. It should be noted, however, that the scope of the present invention is not limited by the illustrated examples.

Example 1

A cathode active material containing lithium and an anode active material containing graphite were applied to opposite major surfaces of an aluminum foil and a copper foil, respectively, and then the aluminum foil and the copper foil were cut to manufacture cathode plates and anode plates, having electrode tabs to which the active materials were not applied. Subsequently, the cathode plates and the anode plates were sequentially stacked while separators were disposed respectively between the cathode plates and the anode plates. After that, a cathode lead was welded to the cathode tabs, while the cathode lead was disposed between the cathode tabs, and an anode lead was welded to the anode tabs, while the anode lead was disposed between the anode tabs, as shown in FIG. 4, to manufacture an electrode assembly.

Comparative Example 1

Figure 1:
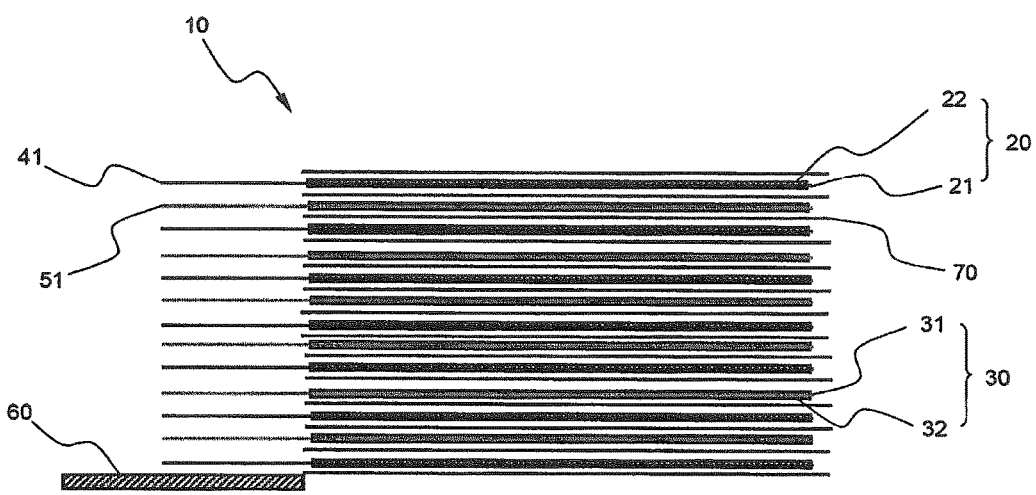
FIG. 1 is a typical view illustrating the general structure of a conventional stacking type electrode assembly.
Figure 2:
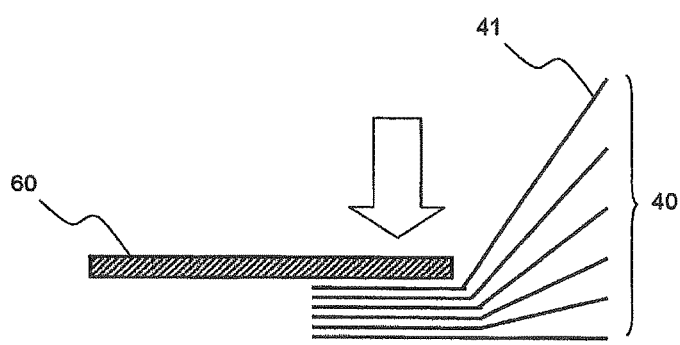
FIGS. 2 and 3 are partially enlarged views illustrating the connection between cathode tabs, joined to each other in a concentrated state, and a cathode lead of the electrode assembly shown in FIG. 1.
Figure 3:
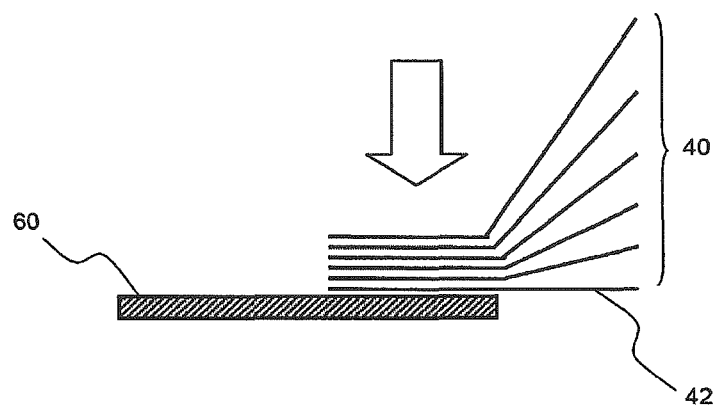

An electrode assembly was manufactured in the same method as Example 1 except that the cathode lead was welded to the cathode tabs, while the cathode lead was located at the bottom of the lowermost cathode tab, and the anode lead was welded to the anode tabs, while the anode lead was located at the bottom of the lowermost anode tab, as shown in FIG. 3.

Experimental Example 1

Resistance measurement experiments were carried out on 20 electrode assemblies manufactured respectively according to Example 1 and Comparative example 1. The experiment results are indicated in Table 1 below. The experiments were repeatedly carried out on the respective 20 electrode assemblies. The resistance at the joint portion between the cathode tabs and the cathode lead was measured using an Agilent milli-ohmmeter. The measured experiment values are indicated in Table 1 below as an average resistance value.

Group A of Table 1 below indicates the cathode tabs located at the upper part of the electrode assembly. For Example 1, Group A indicates the cathode tabs located at the top of the cathode lead. For Comparative example 1, Group A indicates the cathode tabs at long distances from the cathode lead. Group B of Table 1 below indicates the cathode tabs located at the lower part of the electrode assembly. For Example 1, Group B indicates the cathode tabs located at the bottom of the cathode lead. For Comparative example 1, Group B indicates the cathode tabs at short distances from the cathode lead.

TABLE 1

| | Average Resistance of A-group Cathode tabs (m·) | Average Resistance of B-group Cathode tabs (m·) | Average Resistance difference between electrodes |
|---|---|---|---|
| Example 1 | 5.32 | 5.31 | 0.01 |
| Comparative Example 1 | 5.37 | 5.32 | 0.05 |

As can be seen from Table 1 above, the resistance of the cathode tabs located at the top of the cathode lead was approximately equal to that of the cathode tabs located at the bottom of the cathode lead in the electrode assembly manufactured according to Example 1. Specifically, the resistance difference did not occur at all the cathodes. In the electrode assembly manufactured according to Comparative example 1, on the other hand, the resistance difference occurred between the cathode tabs at short distances from the cathode lead and the cathode tabs at long distances from the cathode lead. Even though the resistance difference is slight, the resistance difference causes the operational nonuniformity between the electrodes during the repetitive charge and discharge of the electrode assembly or in a high-output, large-capacity battery pack having a large amount of electric current. Especially, the resistance difference causes rapid deterioration of specific electrodes, during the long-term use of the electrode assembly, with the result that the life span of a battery is reduced.

INDUSTRIAL APPLICABILITY

As apparent from the above description, the electrode assembly according to the resent invention has the following effects. The electrode assembly is constructed in a structure in which the resistance difference between electrodes is minimized. Furthermore, the electrode assembly is constructed in a structure in which the joint force between electrode tabs and each electrode lead is increased, whereby high reliability is secured.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A stacking or stacking/folding type electrode assembly of a cathode/separator/anode structure, comprising:
    a plurality of electrode plates;
    an electrode lead; and
    a plurality of electrode tabs having no active material applied thereto, the electrode tabs protruding from the electrode plates, and being electrically connected to the electrode lead, the pluralities of electrode tabs being joined to a top and a bottom of the electrode lead at an electrode lead-electrode tabs joint portion, wherein the electrode tabs include bending sections and coupling sections, the bending sections being increasingly angled from a lowermost electrode tab to an uppermost electrode tab.

2. The electrode assembly according to claim 1, wherein the number of the electrode tabs joined to the top of the electrode lead is approximately equal to that of the electrode tabs joined to the bottom of the electrode lead.

3. The electrode assembly according to claim 1, wherein the electrode lead is made of a metal plate.

4. The electrode assembly according to claim 3, wherein the metal plate is selected from a group consisting of an aluminum plate, a copper plate, a nickel plate, a copper plate coated with nickel, and a SUS plate.

5. The electrode assembly according to claim 1, wherein the electrode lead is formed in the shape of a straight line in vertical section, and the electrode lead is joined to the electrode tabs by welding.

6. An electrochemical cell including an electrode assembly according to claim 1.

7. The electrochemical cell according to claim 6, wherein the electrochemical cell is a secondary battery or a capacitor.

8. The electrochemical cell according to claim 7, wherein the secondary battery is constructed in a structure in which an electrode assembly is mounted in a battery case made of a laminate sheet including a metal layer and a resin layer in a sealed state.

9. The electrochemical cell according to claim 8, wherein the secondary battery is a unit cell for high-output, large-capacity battery packs.

* * * * *